United States Patent
Margomenos et al.

(10) Patent No.: US 8,013,784 B2
(45) Date of Patent: Sep. 6, 2011

(54) BUTLER MATRIX FOR 3D INTEGRATED RF FRONT-ENDS

(75) Inventors: Alexandros Margomenos, Ann Arbor, MI (US); Ruihua Ding, Seattle, WA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 173 days.

(21) Appl. No.: 12/396,665

(22) Filed: Mar. 3, 2009

(65) Prior Publication Data

US 2010/0225539 A1    Sep. 9, 2010

(51) Int. Cl.
*G01S 7/02*   (2006.01)
*H01Q 3/00*   (2006.01)
*G01S 13/00*  (2006.01)

(52) U.S. Cl. ............ 342/175; 342/82; 342/89; 342/368; 342/373; 342/700 MS (58) Field of Classification Search ........... 343/700 MS; 342/82–103, 175, 192–197, 368–377, 27, 342/28, 70–72
See application file for complete search history.

(56) References Cited

U.S. PATENT DOCUMENTS

| | | | |
|---|---|---|---|
| 3,997,900 A * | 12/1976 | Chin et al. ............ | 342/373 |
| 4,810,982 A | 3/1989 | Wong | |
| 5,008,678 A * | 4/1991 | Herman ............ | 342/70 |
| 5,508,706 A * | 4/1996 | Tsou et al. ............ | 342/192 |
| 5,610,617 A | 3/1997 | Gans et al. | |
| 5,724,042 A * | 3/1998 | Komatsu et al. ............ | 342/175 |
| 5,777,579 A | 7/1998 | Goetz et al. | |
| 5,933,109 A * | 8/1999 | Tohya et al. ............ | 342/175 |
| 5,995,049 A * | 11/1999 | Komatsu et al. ........ | 343/700 MS |
| 6,091,355 A * | 7/2000 | Cadotte et al. ............ | 342/175 |
| 6,130,640 A * | 10/2000 | Uematsu et al. ............ | 342/175 |
| 6,137,434 A * | 10/2000 | Tohya et al. ............ | 342/70 |
| 6,215,443 B1 * | 4/2001 | Komatsu et al. ........ | 343/700 MS |
| 6,249,242 B1 * | 6/2001 | Sekine et al. ............ | 342/70 |
| 6,492,949 B1 | 12/2002 | Breglia et al. | |
| 6,501,415 B1 * | 12/2002 | Viana et al. ............ | 342/27 |
| 6,601,415 B2 | 8/2003 | Takinami et al. | |
| 6,642,908 B2 * | 11/2003 | Pleva et al. ............ | 343/700 MS |
| 6,864,837 B2 * | 3/2005 | Runyon et al. ............ | 342/372 |
| 7,183,995 B2 | 2/2007 | Pleva et al. | |
| 7,248,215 B2 | 7/2007 | Pleva et al. | |
| 7,733,265 B2 * | 6/2010 | Margomenos et al. ........ | 342/70 |
| 7,830,301 B2 * | 11/2010 | Margomenos ............ | 342/70 |
| 7,834,808 B2 * | 11/2010 | Thompson et al. ........ | 343/700 MS |

OTHER PUBLICATIONS

Junho Cha and Yasuo Kuga, "A Mechanically Steerable Array Antenna Using Controllable Dielectric Phase Shifters for 77 GHz Automotive Radar Systems," Department of Electrical Engineering, University of Washington (1-4244-0123-2/06/$20.00 2006 © IEEE), pp. 859-862.

(Continued)

*Primary Examiner* — Bernarr E Gregory
(74) *Attorney, Agent, or Firm* — Gifford, Krass, Sprinkle, Anderson & Citkowski, P.C.

(57) ABSTRACT

A radar apparatus comprises a substrate having first and second sides, an antenna including radiative elements disposed on the first side of the substrate, a Butler matrix supported by the substrate having input and output ports, where each output port of the Butler matrix is electrically connected to a group of radiative elements, and input connections between a radio-frequency (RF) circuit and the input ports of the Butler matrix. The RF circuit may be supported by the second side of the substrate.

20 Claims, 7 Drawing Sheets

OTHER PUBLICATIONS

G. Tudosie et al., "A novel modularized folded highly compact LTCC Butler Matrix," IEEE IMS Conference 2008.

S. Zheng at al., "Compact Butler Matrix using size reduced elements," Microwave and Optical Technology Letters, vol. 49, No. 7, Jul. 2007, pp. 1519-1521.

J.S. Neron et al., "Microstrip EHF Butler Matrix Design and Realization," ETRI Journal, vol. 27, No. 6, Dec. 2005, pp. 788-797.

A. Nedil, et al., "Novel Butler Matrix Using CPW Multilayer Technology," IEEE Transactions on Microwave Theory and Techniques, vol. 54, No. 1, Jan. 2006, pp. 499-507.

T.Y. Chin et al., "A 24 GHz CMOS Butler Matrix MMIC for Multi-Beam Smart Antenna Systems," IEEE RFIC Conference 2008.

\* cited by examiner

BUTLER MATRIX FOR 3D INTEGRATED RF FRONT-ENDS

FIELD OF THE INVENTION

The invention relates to electromagnetic devices, for example radar antennas.

BACKGROUND OF THE INVENTION

Antennas are useful for a variety of applications, for example automotive radar applications. A low cost antenna having a steerable beam is highly desirable. However, conventional radars are expensive and bulky.

SUMMARY OF THE INVENTION

Embodiments of the present invention relate to microwave applications, in particular millimeter wave antennas including automotive radar antennas. Examples of the present invention include improved apparatus and methods for including a Butler matrix between an RF circuit and an antenna. Examples of the present invention include a low loss RF substrate for microwave and/or millimeter wave applications, the substrate supporting an antenna array and a Butler matrix.

A Butler matrix can be formed as a multi-layer structure, such as a two-layer structure on a sheet-like substrate, which significantly reduces the overall size of the matrix. For example, a Butler matrix may comprise planar waveguide components supported by microwave substrate. Liquid crystal polymer (LCP) is a relatively low-cost microwave/mm-wave substrate which can be used in multi-layer substrates. For the first time, a Butler matrix was designed using a microwave substrate (LCP), allowing creation of a Butler matrix operational at 77 GHz (the operating frequency for a long range automotive radar), or other microwave or mm-wave frequency. The substrate for the Butler matrix may be the same substrate used to support conducting elements of the antenna.

Examples of the present invention include an electronically steered antenna array for radar applications, including long range automotive radars at 77 GHz. For the first time, low loss operation of a Butler matrix at 77 GHz is possible. A Butler matrix may be combined with an antenna array on a single substrate. An improved RF front end includes an RF circuit, a Butler matrix, and an antenna array. Examples include a Butler matrix for 77 GHz automotive radar applications, including scannable radars.

Examples of the present invention also include improved crossover regions within the Butler matrix. In some examples, a 3D transition is used from a microstrip line on the upper surface of the substrate to a co-planar waveguide (CPW) on the lower surface of the substrate. In some examples, the upper microstrip line is transformed into a short CPW section proximate the crossover. This exploits the CPW mode properties to reduce the effects of the discontinuity of the separated ground plane on the lower surface of the substrate.

Examples of the present invention can reduce the cost and simplify the manufacture of a radar, as the requirements for the T/R module are simplified. The need for any active elements (e.g. GaAs switches or phase shifters) for electronic beam steering can be eliminated.

A Butler matrix can be supported on the same substrate used to support the antenna elements. The antenna may be a planar array antenna, for example a microstrip planar antenna array. The RE circuit may optionally be connected to the inputs of the Butler matrix using transition vias through the substrate. The outputs of the Butler matrix may be connected to antenna elements using microstrip lines and/or planar waveguides.

In some examples of the present invention, a substrate has an antenna (such as an antenna array) supported on a first side, and an RF circuit module and a printed circuit board (PCB) proximate the other (second) side. A Butler matrix comprises generally planar elements formed on the substrate, and in some examples can be a two layer structure including transition vias through the substrate.

Hence, an apparatus for transmission and/or reception of microwave radiation comprises a substrate (such as a liquid crystal polymer layer) having a first side and a second side, an antenna array supported on the first side of the substrate, and a Butler matrix supported by the substrate. The Butler matrix has output ports connected to the antenna elements. For example, a microstrip line or other transmission line may connect an output port to a column of antenna elements. Electrical connections to the Butler matrix inputs from the RF circuit may include a transition via through the substrate.

An example apparatus comprises a substrate having a first side and a second side, an antenna disposed on the first side of the substrate, the antenna including radiative elements such as patches. A Butler matrix can be supported by the same substrate as used for the substrate. The Butler matrix has input ports and output ports, each output port of the Butler matrix being in electrical communication with a group of radiative elements such as a column of radiative elements. The apparatus also input connections configured to allow electrical communication with the input ports of the Butler matrix. Examples of the present invention include an antenna and a Butler matrix integrated on the same microwave substrate, and used for radar applications in the microwave or millimeter wavelengths. Examples of the present invention include steerable radars, for example generating and/or receiving radar beams in (or from) predetermined selectable directions.

An example apparatus may further include an RF circuit. The RF circuit can be supported proximate or adjacent the second side of the substrate. In some examples, each input connection between the RF circuit and an input port of the Butler matrix includes a transition via through the substrate, a first input transmission line between the RF circuit and the transition via (such as a CPW); and a second input transmission line between the transition via and the input port (such as a CPW-microstrip combination).

A Butler matrix may be formed from generally planar elements on the substrate, and may include a plurality of microstrip lines disposed on the first side of the substrate. A Butler matrix may have four input ports and four output ports, though other numbers of input and output ports are possible. Input or output ports may be provided by transmission lines on the substrate. Each output port is connected to a group (for example a column) of radiative elements within the antenna.

A Butler matrix typically includes crossover regions. A crossover region allows two transmission lines to cross each other. In an example approach, a first transmission line may remain on the first side of the substrate, whereas the second (crossing) transmission line is transitioned to the second side of the substrate using a transition via, passes under the first transmission line, and is then transitioned back to the first side of the substrate using a second transition via. Hence, a crossover may comprise a first transmission line on the first side of the substrate, a second transmission line on the second side of the substrate, and a transition via at each end of the second transmission line, connecting to input and output transmission lines on the first side of the substrate.

In some examples, the second side of the substrate has a conducting sheet that acts as a ground plane for both the antenna and for microstrip lines on the first side of the substrate. For a crossover, an elongated portion of the conducting sheet is isolated using an air gap, giving a CPW. The CPW may have via pads on each end, and these may be circular pads surrounding the transition via.

Further, the transmission line on the first side of the substrate may be transitioned from a microstrip line to a CPW, this CPW crossing a CPW on the opposite side at the crossover, the CPW then being transitioned back to a microstrip line. The transition to a CPW at the crossover helps reduce the effects of the non-uniformity of the ground plane on the second side of the substrate.

Examples of the present invention include a radar apparatus comprising a substrate, an antenna disposed on the first side of the substrate, a Butler matrix supported by the same substrate, and a radio-frequency circuit (RF circuit) supported by or otherwise proximate the second side of the substrate. Each connection between the RF circuit and an input port of the Butler matrix may comprise a CPW on the second side, a transition via, and a CPW transitioning to a microstrip line connecting to the input port. Hence, each input connection between the RF circuit and an input port of the Butler matrix may comprise a transition via through the substrate.

Examples of the present invention include an improved radio-frequency (RF) front end assembly for a radar. The antenna may be a patch antenna comprising an array of conducting patches supported by the substrate, the radar providing a steerable radar beam using the Butler matrix.

An RF circuit may be located on or adjacent the substrate. In some examples, one or more thermal vias may be provided through the substrate for purposes such as heat sinking of the RF circuit, for example using a thermal via to conduct heat away from the RF circuit to a heat-sink mounted on the substrate.

Examples of the present invention include automotive radar apparatus, such as RF front ends. An RF front end may comprise an antenna array, a substrate such as a liquid crystal polymer layer, and an RF circuit such as a transmit/receive module. In some examples, an apparatus may further comprise associated control electronics support by one or more circuit boards. Examples of the present invention include improved radar apparatus in which the antenna and Butler matrix are supported by the same substrate, which may be referred in some examples as the substrate.

In some examples, the connection between the RF circuit and the input ports of the Butler matrix may each comprise a transition via extending through the substrate. A Butler matrix may include additional transition vias, for example to facilitate crossovers. For each crossover within the Butler matrix, a pair of transition vias may be used to transition a microstrip line to a coplanar waveguide section within the crossover region. In some examples, transition vias and the associated via pad may be configured so as to provide impedance matching with input and output transmission lines.

DETAILED DESCRIPTION OF THE PREFERRED EMBODIMENTS

Examples of the invention include apparatus and methods relating to the use of a 3D integrated Butler matrix for radar applications. A Butler matrix can be used in electronically scanned antennas, e.g. for antenna beam steering. A Butler matrix can be used to generate a set of predefined beams, and allows switching between the beams in order to point a radar beam in a specific direction. Hence, examples of the present invention include steerable radar devices.

A Butler matrix may be a fully-passive mm-wave circuit that includes hybrid couplers, phase delay lines and crossovers, and can transform signals from N antenna elements to a set of N beams. Planar configurations of the Butler matrix can have the advantage of easier manufacturing process and lower cost. However, the crossover region in the Butler matrix becomes a challenge.

Examples of the present invention include a Butler matrix designed for operation at 77 GHz, for automotive radar applications. A 77 GHz design for Long Range Radar applications has not been previously described. The Butler matrix can be formed on a microwave substrate (a substrate having low loss at microwave wavelengths), and in some examples the Butler matrix is formed on the same substrate used to support the antenna. The substrate may be a liquid crystal polymer (LCP) substrate, which are commercially available and have low loss at 77 GHz.

In some examples, the crossover regions of the Butler matrix are formed using via transitions through the substrate. For example, a waveguide or microstrip line can cross another waveguide or microstrip line by transitioning to the opposite side of the substrate.

In some crossover examples, a microstrip line on the one side of a substrate is transitioned to a CPW line on the other side of the substrate using a transition via, the CPW being transitioned back to through another transition via to a microstrip line.

Further, in some crossover examples, a microstrip line on one side of the substrate is transitioned to a short CPW section at the location of the crossover with a second CPW on the other side of the substrate. This allows the crossover to occur with minimized parasitic effects due to ground plane separation by the second CPW.

A novel Butler matrix design combines a microstrip with a CPW interconnect in order to achieve better high frequency performance. By considering the modes that propagate in the CPW and the microstrip line, Butler matrix components can be configured so that the discontinuity due to the separated ground plane is effectively invisible to the propagating electromagnetic waves.

Examples of the present invention include improved three-dimensional (3D) RF front ends for automotive radars. Applications can include any millimeter wave RF front end application, including 60 gigahertz WLAN/WPAN applications, communication systems, W band imaging, and the like.

An improved automotive radar includes an antenna array, RF electronic front end, and a transition between the RF electronic front end and the antenna array, the transition including a transition via through the substrate used to support the antenna array. A Butler matrix is supported by the substrate, and the Butler matrix inputs are connected to the transition vias, and the outputs are connected to antenna elements.

The substrate may be a low-loss dielectric material at operational frequencies. The substrate may have, for example, a thickness in the range 10 microns to 1 millimeter, in particular 50-500 microns, for example approximately 100 microns.

The antenna substrate may be associated with, for example bonded to, a printed circuit board used to support associated electronics, including electronic circuitry used to control the transmitted radar signal or to interpret received signals.

The use of a 3D integrated Butler matrix for electronically switching the radiated beam reduces the cost of the radar, compared with conventional switchable radar apparatus using GaAs single-pole-multiple-throw switches. GaAs components are relatively expensive, are active circuits requiring a fairly complex biasing scheme, consume power, and generate heat during operation. GaAs switches are active devices and therefore add thermal and switching noise to the system.

In comparison, a Butler matrix can be a fully passive circuit that requires no power consumption or biasing voltage, and generates no heat. The use of a Butler matrix can significantly simplifies the design and operation of a radar. Further, a fully passive system reduces the overall noise figure of the receiver and increases the range of the radar, compared with conventional configurations. Range is also improved by the fact that a fully passive device such as the Butler matrix is more linear that the GaAs switches.

A Butler matrix can be located between the antenna array and the RF circuit (such as a packaged flip-chip mounted T/R module). A passive Butler matrix can be used to allow beam steering capabilities that conventionally are performed within the RF circuit using a 4-bit phase shifter. This significantly reduces the complexity of the RF circuit, and a simplified T/R module chip can be used.

The use of the Butler matrix simplifies the design and reduces the cost of a packaged flip-chip T/R module. A simpler chip is easier to fabricate, and can be produced at a higher yield. Removing the 4-bit phase shifter from the T/R module chip reduces the chip size. A smaller chip area means that more chips can fit on a wafer, and therefore the number of chips per wafer produced increases, reducing costs.

Figure 1:
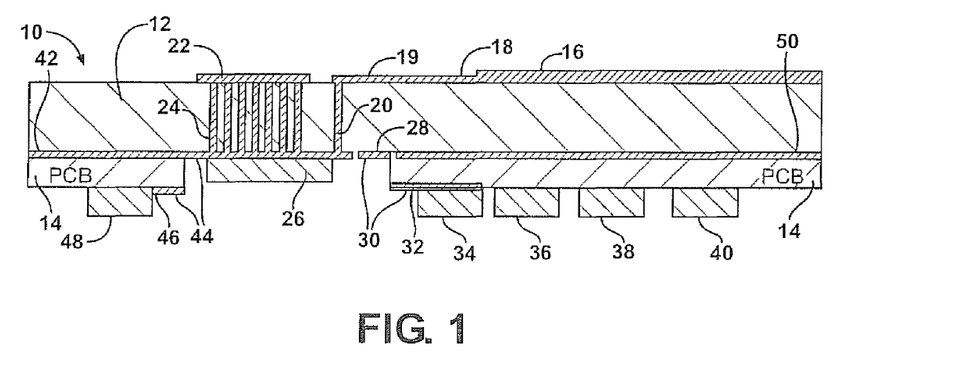
FIG. 1 shows a cross section of an RF front end including a passive Butler matrix for use in a radar apparatus.

FIG. 1 shows a cross section of an example automotive radar front end (10). The figure shows a substrate in the form of liquid crystal polymer (LCP) layer 12 used as a substrate, the substrate supporting an antenna array generally at 16. In this example, the antenna array is configured for 77 GHz operation. An antenna feed 18 (in this example comprising a microstrip line) runs from at least part of the antenna array to a Butler matrix disposed on the substrate at a possible location indicated at 19. The Butler matrix configuration is discussed in more detail below. The Butler matrix is connected to the RF circuit through transition via 20. In this example, the antenna and the Butler matrix are both located on the same substrate.

A radio-frequency circuit (RF circuit) in the form of a packaged flip chip mounted transmit/receive (T/R) module is shown at 26. Heat is conducted away from the RF circuit 26 by thermal vias 24 through heat sink 22.

The electrical interconnection between the RF circuit and the antenna carries signals at the operating frequency of the radar, such as 77 GHz. Conventionally, Butler matrices have not previously been developed for use at such frequencies. The RF circuit may be operate as a mixer, so that electrical communication with the control circuit occurs at greatly reduced frequencies (e.g. <2 GHz) and may use conventional wire bond connections.

An (optional) printed circuit board at 14 is used to support associated electronic components such as a digital signal processor, digital clock, temperature control, microprocessor/DLL, DC and data ports. The layer shows at 14 may represent a multilayer or single layer printed circuit board. Associated electronic components, such as a microprocessor, clock, and the like, are shown generally at 34, 36, 38, 48 and 40. However the arrangement of such components on PCB 14 is not critical, and components can be combined into a single chip such as an ASIC.

Wire bond connections such as 44 and 30 (connected at 32 and 46, respectively) may be used for the communication of intermediate frequency (IF) and/or digital signals. These are at substantially lower frequencies than 77 gigahertz. The PCB 14 may have a conducting layer 42 disposed thereon, the conducting layer providing a ground plane 50 for the antenna array 16. However it is not necessary that the ground plane 50 is provided by a conducting layer on the PCB, as the conducting layer may be formed on the lower surface of substrate 12.

In some examples of the present invention, the PCB is bonded or otherwise laminated with the substrate 12. For example, a thin sheet of glue, e.g. 20-25 microns thickness of glue, may be used to bond the PCB to the LCP substrate.

The antenna may be a steering array, for example configured to transmit and/or receive radiation along an adjustable directional range. A transition via such as 20 may be used for each input port of the Butler matrix, as discussed further below.

The antenna feed 18 may comprise a microstrip line between an output port of the Butler matrix and the antenna elements. The antenna may comprise an array of conducting patches. The electrical connection between the RF circuit and the transition via 20 may comprise a coplanar waveguide. The connection between the transition via 20 and the Butler matrix input port may comprise a CPW and/or a microstrip line. The transition via 20 interconnect first and second via pads on the upper and lower sides of the substrate, and these can be configured to reduce losses by matching the impedance of the transmission via to that of the transmission lines.

As illustrated, the upper surface of the substrate supports the antenna patches, though the terms upper and lower are not intended to be limiting.

Figure 2A:
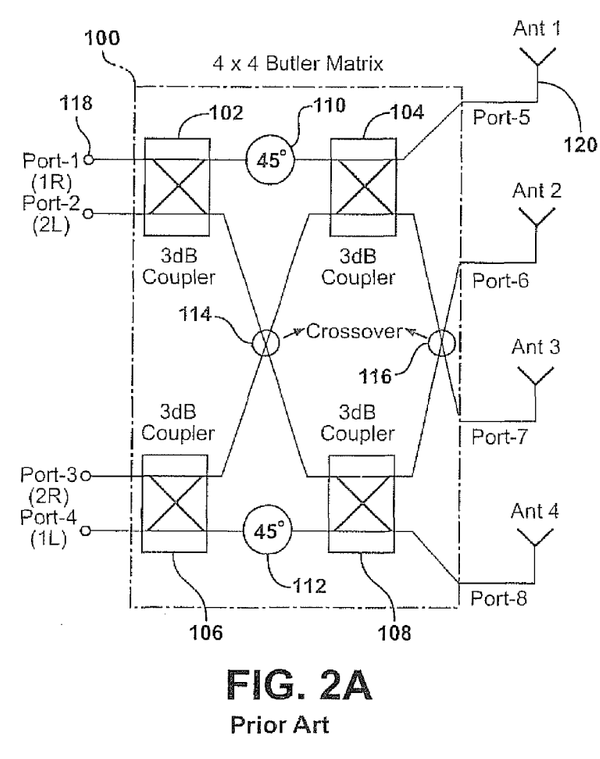
FIG. 2A (prior art) is a block diagram of a typical 4×4 Butler matrix.

FIG. 2A (prior art) shows schematic of a typical 4×4 Butler matrix 100, where four inputs are combined to give orthogonal beams pointing in specific directions. The Butler matrix 100 comprises four couplers (102, 104, 106, and 108), two −45° phase delays (110 and 112), and two crossovers 114 and 116. The four inputs (e.g. input 118) are processed to give four outputs (e.g. output 120).

Figure 2B:
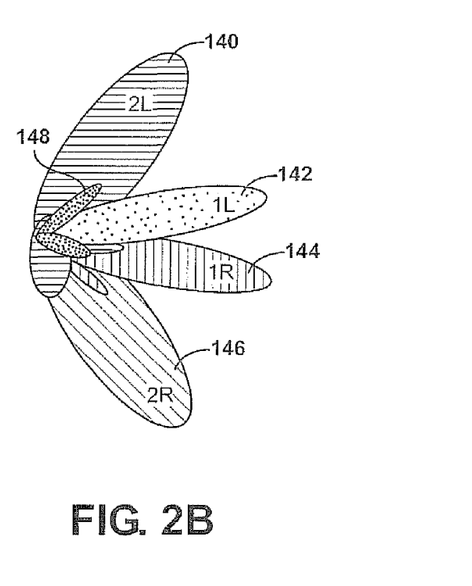
FIG. 2B illustrates switchable beam directions.

FIG. 2B is a simplified schematic of four beam directions obtainable using the Butler matrix of FIG. 2A. The beam directions are shown at 140, 142, 144, and 146. Sidelobes such as sidelobe 148 may also be present.

Figure 3:
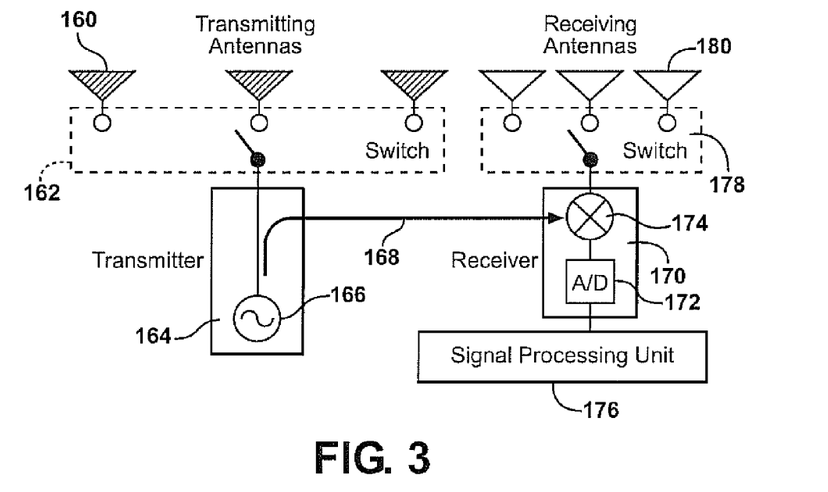
FIG. 3 is a block diagram of a switch-beam automotive radar RF front-end using time-domain modulation.

FIG. 3 is a block diagram of a radar RF front end. In this example, the RF front end includes antenna transmitter elements 160, switching circuit 162, transmitter circuit 164 (which may include amplifiers, filters, and the like), and radiation source 166. Antenna receiving elements 180 are connected to a switching circuit 178 and receiver 170. The receiver includes mixer 174 and analog to digital converter 172, and the receiver output is sent to a signal processing unit 176. The receiver is connected to the transmitter through link 168.

In a conventional apparatus, the receiver side of the front-end uses GaAs single-pole-multiple-throw switches using pin diodes to switch the separate receiver antennas on and off. However, this approach may have various disadvantages, such as the high cost of the GaAs multiple pole switches, significant losses due to the GaAs switches, switch non-linearity problems, the power requirements and added complexity of a biasing network for switch activation, and digital noise from switch activation.

The use of a fully passive Butler matrix can eliminate the need for GaAs switches and therefore significantly improve radar performance.

An N×N Butler matrix creates N orthogonal beams in space by combining the signals from an N-element linear array. These beams point in directions given by the following equation:

$$\sin\theta_i = \pm \frac{i\lambda}{2Nd}, i = 1\ldots(N-1) \quad (1)$$

The corresponding inter-element phase shift with spacing d=λ/2 is $$a_i = \beta d \sin\theta_i = i\frac{\pi}{N},$$

where β the wave number. A 4×4 Butler matrix has four hybrid couplers, two 45° phase delay lines, and two crossovers, as shown in FIG. 2A.

Figure 4:
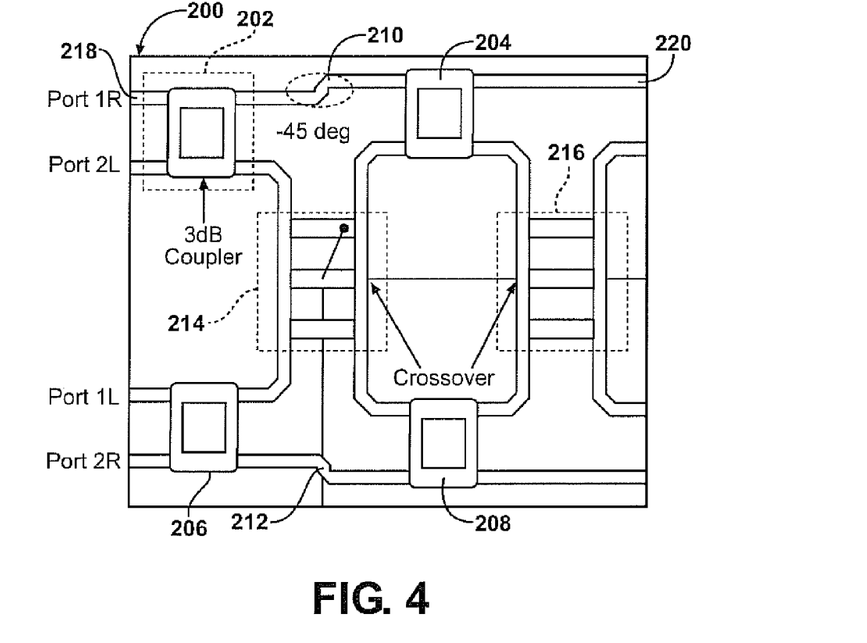
FIG. 4 shows a schematic of 4×4 Butler matrix using two cross-coupler circuits.

FIG. 4 shows the schematic of a 4×4 Butler matrix using cross-coupler circuits. The Butler matrix 200 includes 4 cross-couplers (3 dB couplers shown at 202, 204, 206, and 208), two −45° phase delays (210 and 212), port 218, and two crossovers 214 and 216.

Figure 5:
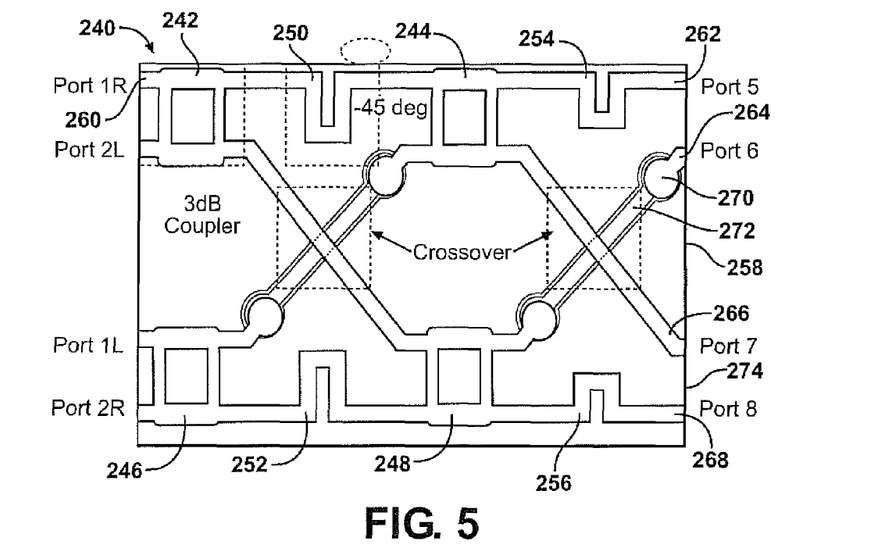
FIG. 5 is a schematic of an improved Butler matrix, which may be fabricated on a microwave substrate.

FIG. 5 shows the schematic of an improved Butler matrix. This example design 240 has 4 hybrid couplers (242, 244, 246, and 248), phase retarders (250, 252, 254, 256), 2 crossovers (such as 258), 4 input ports (such as 260, labeled 1R, 2L, 1L, and 2R), and 4 output ports (262, 264, 266, and 268, labeled Ports 5-8 respectively). In this example, the output ports are formed by microstrip lines. The Butler matrix can be formed on a low loss substrate 274 using metal strips. Most of the Butler matrix components are formed on the first side of the substrate. The lower side of the substrate may be coated with a conducting film, except for waveguide portions at the crossovers. For example, crossover 258 is achieved using a microstrip line from coupler 244 to port 266 on the upper surface of the substrate crossing a waveguide section 272 on the lower surface of the substrate. The waveguide portion can be formed within a ground plane on the lower surface. Via transitions, such as 270, interconnect conductors on upper and lower surfaces. In this example, via transition transitions waveguide 272 to a microstrip line forming output port 264.

Components were initially designed and optimized separately, and later combined and re-optimized together. The circuit was designed on a 100 µm thin LCP layer that has copper metallization on both sides.

Figure 6:
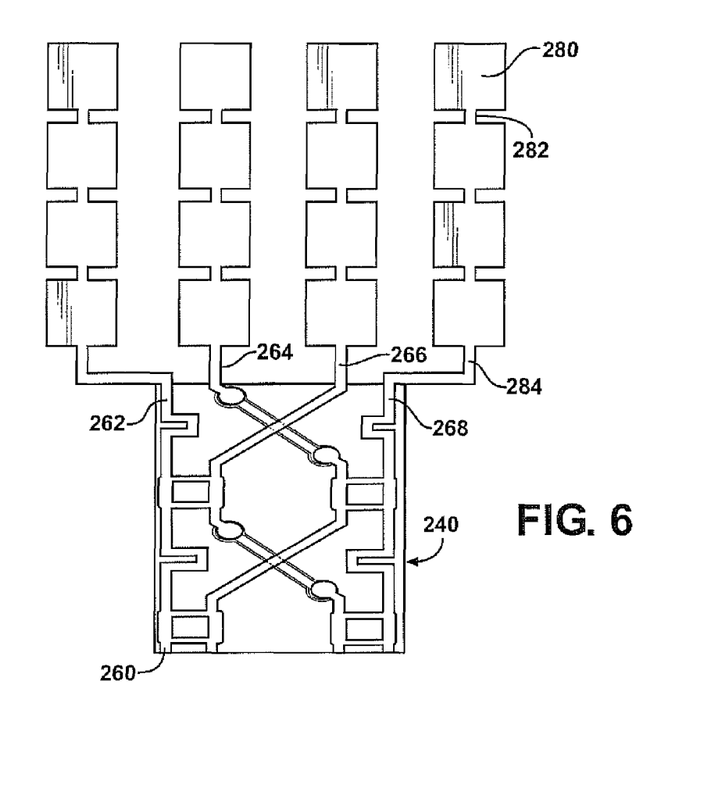
FIG. 6 is a schematic of a Butler matrix combined with a microstrip patch array.

FIG. 6 is a schematic of a Butler matrix combined with a microstrip patch array. The antenna comprises an array of conducting patches 280 connected in columns using microstrip lines such as 282. The Butler matrix 240 has the configuration given above in relation to FIG. 5. The Butler matrix has 4 input ports such as 260, and 4 output ports (262, 264, 266, and 268). Each output port is connected to a column of 4 antenna patches. Microstrip lines connecting the Butler matrix to the antenna patches, such as 284, may include curved or angled portions (e.g. having a mitered bend) to accommodate the antenna patch geometry, for example a column spacing greater than the spacing of the matrix output ports.

In some examples of the present invention, the substrate for the Butler matrix is part of the same substrate used to support the antenna elements, which may be referred to as the "antenna substrate" or merely "substrate".

Figure 7:
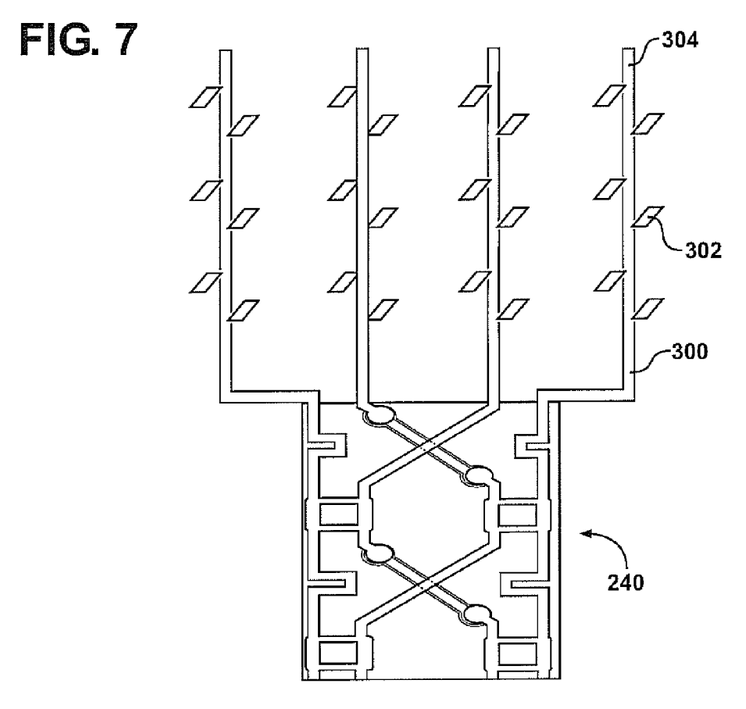
FIG. 7 is a schematic of a Butler matrix combined with a comb-line microstrip array.

FIG. 7 is a schematic of a Butler matrix combined with a comb-line microstrip array, similar to FIG. 6. The Butler matrix 240 has four outputs, as discussed above, each connected to a line 300 (having end portion 304) supporting a plurality of radiative elements such as 302. The connections between the lines and the output ports of the Butler matrix can be configured to accommodate the desired antenna line spacings.

Figure 8:
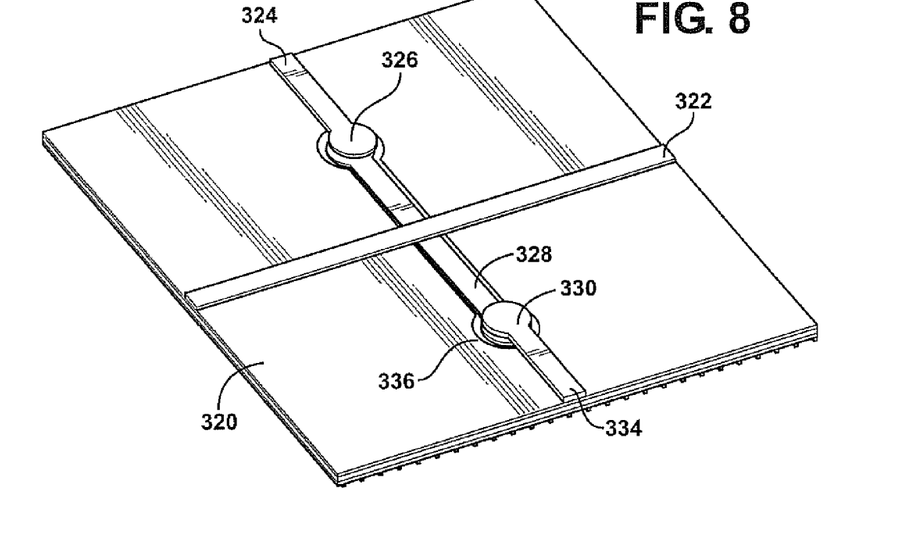
FIG. 8 is a schematic of crossover that uses microstrip-to-CPW transition.

FIG. 8 is a schematic of a novel crossover configuration that uses microstrip-to-CPW transition. The novel crossover configuration can be used in an improved Butler matrix, as shown in FIG. 5. Further, the novel crossover configuration can be used in any microwave or millimeter wave device, for example a microwave device formed on a low-loss substrate.

The figure illustrates a crossover structure that can be used in a Butler matrix or other device, showing a microstrip line 322 formed on the upper surface (as shown) of the substrate 334. The substrate portion illustrated may be part of a more extensive structure. The microstrip 322 extends across the illustrated portion of substrate. Most of the lower portion of the substrate in the illustrated region supports a conducting sheet (a ground plane). A second microstrip line 324 is transitioned to a CPW (coplanar waveguide) 328 through a via transition at 326, and the CPW is transitioned back to microstrip line 334 using via transition at 330. The CPW extends over a portion of the lower surface of the substrate, and is separated from the surrounding ground plane 320 by gap 336.

Figure 9:
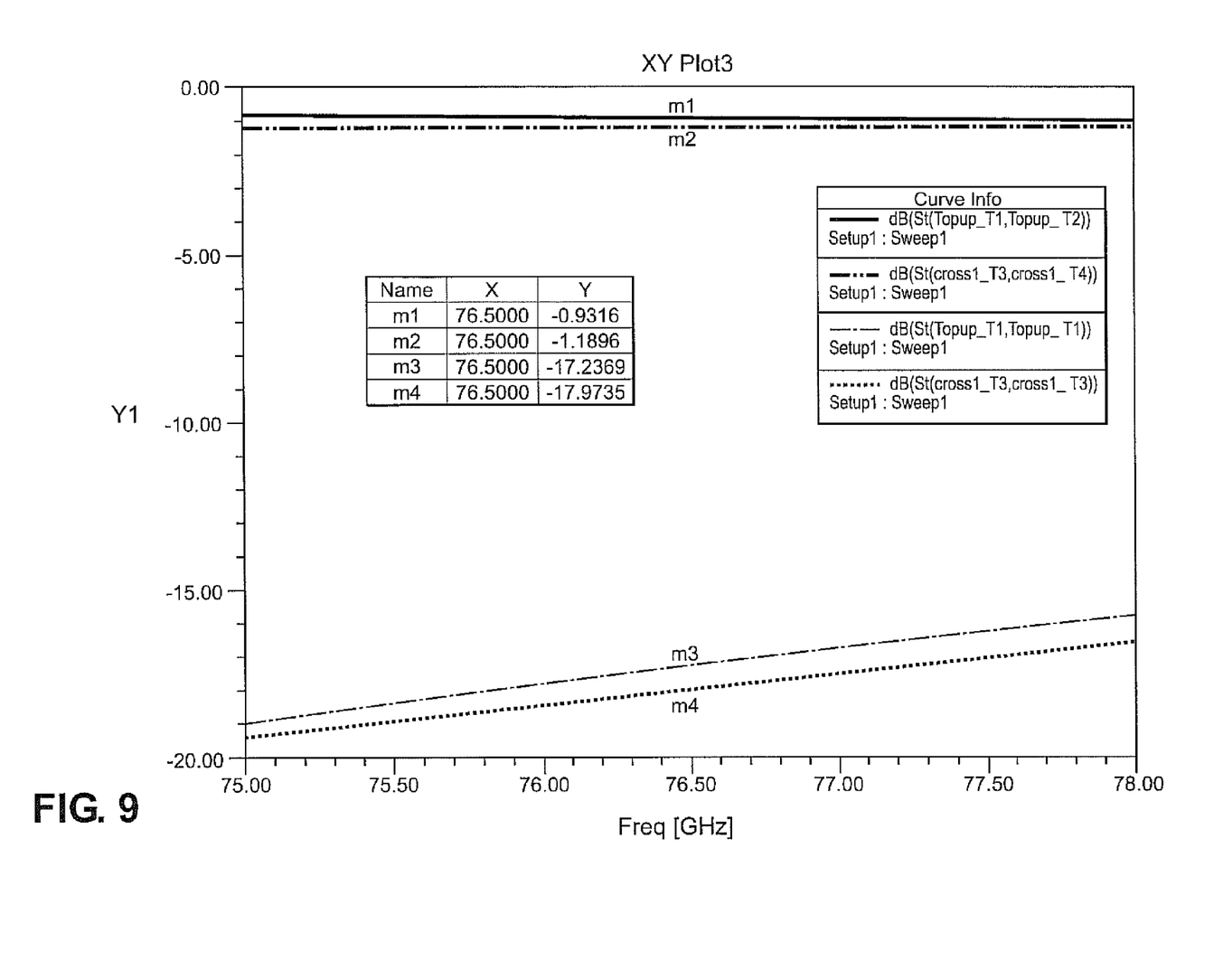
FIG. 9 shows a simulated response for a crossover that uses a microstrip-to-CPW transition.

FIG. 9 shows a simulated response for a crossover that uses a microstrip-to-CPW transition, as illustrated in FIG. 8. In the simulated example, the microstrip lines had an impedance of 50 ohms. The simulated response of this crossover showed an insertion loss of 1 dB and a return loss of −17 dB (curves denoted m1 and m3, at 77 GHz)

For the configuration of FIG. 8, the microstrip line 322 on the upper surface of the substrate has a ground plane that is broken at the crossover by the CPW on the lower surface. This creates a discontinuity for a signal that propagates along the microstrip line 322, and the microstrip mode field leaks into the substrate and through the CPW slots on the lower side.

Figure 10A:
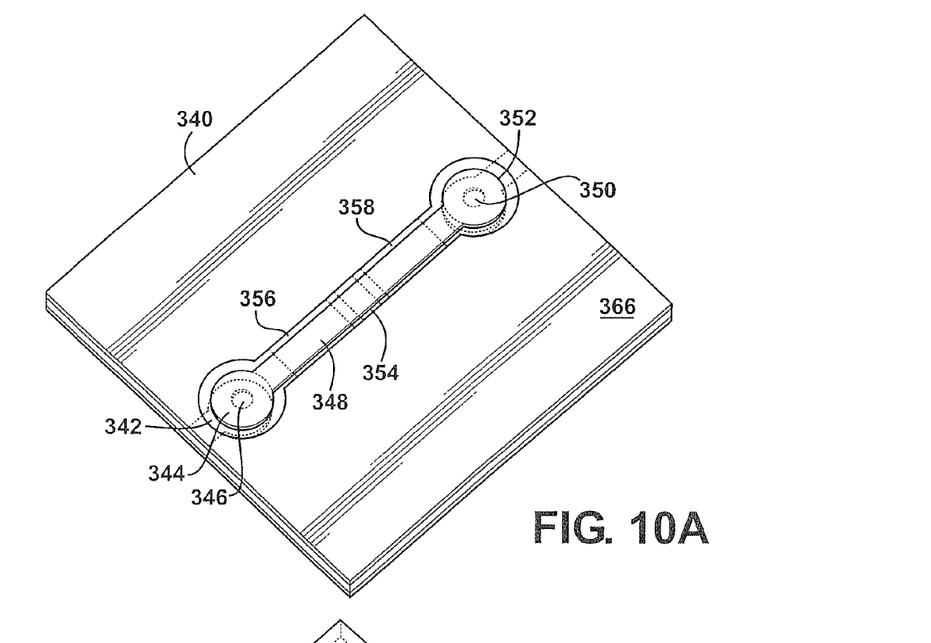
FIGS. 10A and 10B are schematics of a crossover that uses a CPW section.
Figure 10B:
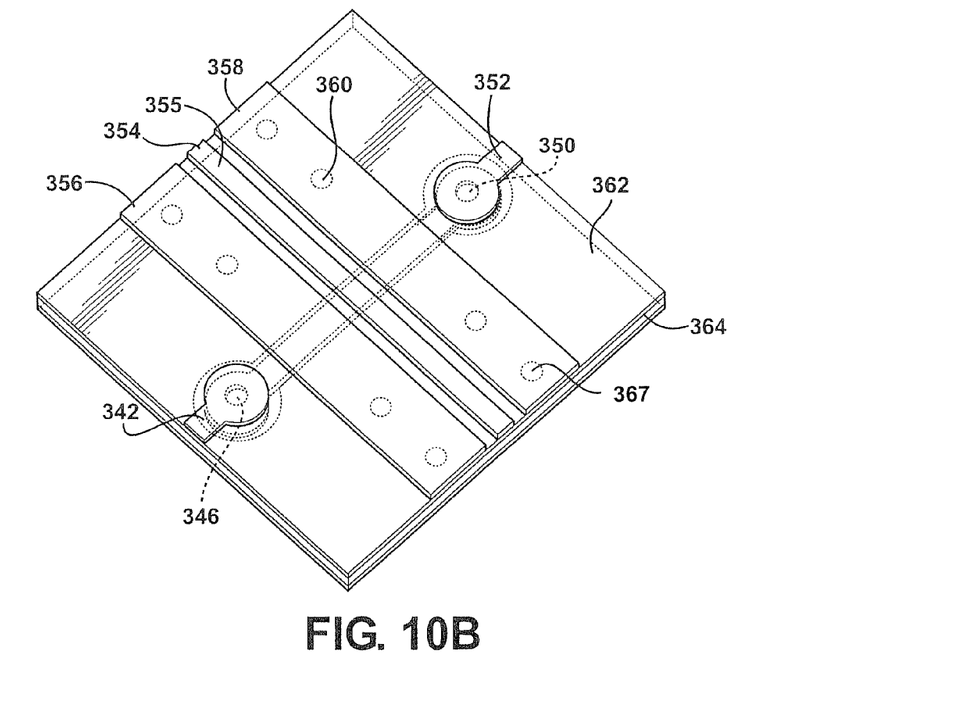

FIGS. 10A and 10B illustrates a crossover configuration that reduces the field leakage. Near the crossover, the upper microstrip line is transitioned to an upper layer CPW. This is done by using vias at the input and output of the upper layer CPW.

FIG. 10A is a bottom view, showing a ground plane 366 extending over most of the lower surface of the substrate 340, with lower CPW 348 formed surrounded by the ground plane and separated from it by a gap extending around the CPW and via pads (344 and 352) located at each end of the CPW. Vias (346 and 350) extend through the substrate to microstrip line segments on the upper surface (342 and 353). The lower CPW configuration is similar to that shown in FIG. 8.

FIG. 10B is a top view. In this example, an upper microstrip line 354 is converted to a CPW segment using a pair of generally rectangular conducting patches 356 and 358 on surface 362. These act as ground planes for the CPW, and are connected to the lower ground plane 366 through vias 360. Four vias were used (2 on each side of the central conducting strip 355, e.g. via 360) at the upper CPW input and 4 vias at the upper CPW output (e.g. via 367).

Since the upper transmission line is now a CPW (and not a microstrip, as in FIG. 8) the electromagnetic wave that propagates along the upper transmission line is a CPW mode. The CPW mode effectively does not see the separation of the ground plane at the lower surface due to the lower CPW. A CPW mode is orthogonal to the microstrip mode, and generally extends parallel to the substrate surface in this example. Therefore, the CPW signal does not see the discontinuity due to the separation of the ground planes. This improves the performance of the crossover to an insertion loss of 0.8 dB and a return loss of −25 dB (curves denoted m2 and m4 in FIG. 9, at 77 GHz).

In some examples, the width of the central stripe of the CPW may be narrower than the microstrip line, which can assist maintenance of a generally constant impedance. The capacitance of the via pads, combined with the self-inductance of the transition via, can be configured to give a transition impedance (e.g. 50 ohms) that matches the transmission lines.

Figure 11A:
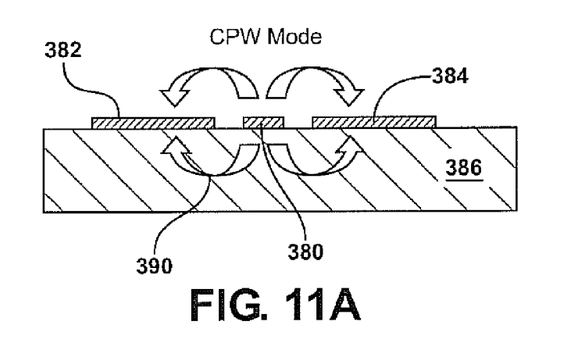
FIGS. 11A and 11B show a comparison of CPW and microstrip modes.
Figure 11B:
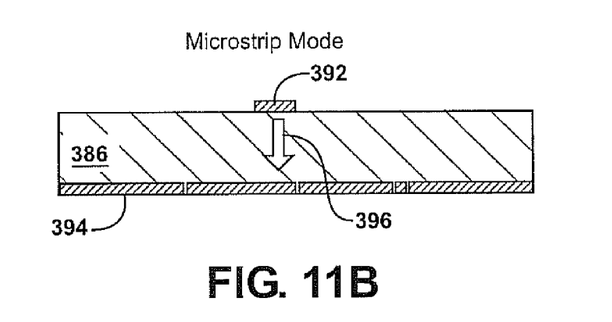

FIGS. 11A-B further illustrates a CPW mode on the upper side of a substrate is generally parallel to the substrate surface, and hence less sensitive to non-uniformities on the lower side. FIG. 11A shows a CPW having a metal stripe 380 centered between a pair of ground portions 382 and 384, on a substrate 386. The CPW mode is indicated by the arrows 390, and is relatively localized on the upper surface (as illustrated). FIG. 11B shows a microstrip line 392 on the substrate, and the microstrip mode is indicated by arrow 396. The microstrip mode is sensitive to irregularities in the ground plane on the second side 394.

Hence, a microstrip line can be transitioned into a CPW near a crossover, the CPW crossing a second CPW on the other side of the substrate, and the CPW is then transitioned back into a microstrip line on the other side of the crossover. The crossover region then comprises a first CPW on the first side of the substrate crossing a second CPW on the second side of the substrate. Each CPW may be transitioned into a microstrip line, with the second CPW transitioned into microstrip line on the first side of the substrate using a transition via.

The metal stripe of the microstrip mode may extend into the central conducting strip of a CPW. The conducting strip of the CPW may be slightly narrower than the microstrip line so as to improve impedance matching.

Substrates

Substrates for the Butler matrix examples, novel crossover configurations, and antenna elements are preferably low loss at the frequency of operation. Example substrates include liquid crystal polymer (LCP) substrates, in particular for use with mm-wave applications such as 77 GHz and 77-81 GHz automotive radars. Improved 3D radio frequency (RF) front-ends may be fabricated on multi-layer, low-cost organic substrates such as LCP. In examples of the present invention, such as waveguide based systems, a 3-dimensional (3D) multi-layer organic substrate (such as a liquid crystal polymer (LCP) or other organic resin) may be used. Preferably, the substrate exhibits low loss signal propagation at the operating frequency (or frequency range), such as 77 GHz. The use of organic substrates, such as LCP or an organic resin, allows elimination of waveguides using costly and difficult to process inorganic substrates such as alumina. LCP is a low cost but high frequency substrate which allows the creation of multi-layer substrates for e.g. mm-wave applications.

The substrate may comprise: an organic material, such as an organic resin; a liquid crystal polymer (LCP); other polymeric material such as a sheet comprising a polymer, a composite, or other polymeric material; an inorganic material such as a semiconductor, ceramic, glass, composite; or other material or combination thereof.

A substrate may comprise one or more of the following: a liquid crystal polymer (LCP) such as Rogers ULTRALAM 3000® series LCP; a fluoropolymer-ceramic substrate, e.g. a micro-dispersed ceramic-PTFE composite such as CLTE-XT® from Arlon, Cucamonga, Calif.; a PTFE glass fiber material such as Rogers RT5880/RO3003®; LTCC (Low Temperature Co-Fired Ceramic); a semiconductor such as silicon or GaAs (gallium arsenide); a dielectric oxide such as alumina; a polyxylylene polymer such as parylene-N; a fluoropolymer, e.g. a polytetrafluoroethylene such as TEFLON® (DuPont, Wilmington, Pa.); DUROID®; or other low-loss material at the frequency or frequency range of interest.

For example, a liquid crystal polymer substrate may be a single-component liquid crystal polymer sheet, a polymeric material such as a composite, blend, or other combination including a liquid crystal polymer component, a combination of liquid crystal polymers, or other material including a liquid crystal polymer.

Example LCP membranes may comprise a synthetic non-liquid-crystalline support material, such as a membrane (for example comprising a polyimide, polyethersulfone, polyethylene terephthalate, polyethylene, polypropylene, polyester, fluoropolymer such as a fluoroethylene polymer or copolymer, and the like) supporting an LCP component. Example LCP components include thermotropic liquid crystal polymers such as aromatic liquid crystalline polyesters, aromatic carboxylic acid polymers, and the like.

The substrate, such as an LCP sheet, may be used as both an interposer material (a substrate upon which different components can be mounted), and a package (for protecting from humidity, dust, and crosstalk). Therefore, the metallic frame of a conventional radar may be in part or entirely replaced with substrate materials of significantly lower cost.

The substrate (e.g. an LCP substrate) may have, for example, a thickness between 10 microns and 1 mm, in particular between 50 microns and 200 microns, for example approximately 100 microns. In representative examples, a substrate had a thickness of 4 mils and a dielectric constant of approximately 3. (1 mil=25.4 microns and 4 mil=101.6 microns). The metal used for the transition via (and/or waveguide or antenna elements) may be copper, gold, silver, platinum, an alloy thereof, or in some examples a conducting polymer or other conductor may be used.

LCP sheets may be obtained from commercial sources, for example the ULTRALAM 3000® series LCP circuit material from Rogers Corp., Chandler, Ariz. For example, according to manufacturer's specifications, ULTRALAM 3850® is a low loss RF substrate having a dissipation factor of less than 0.003 at 10 GHz and 23° C., and may be used as a substrate in examples of the present invention.

In some examples of the present invention, the substrate, such as a liquid crystal polymer, may be used as an interposer material, for example as a substrate on which various components can be mounted. Further the substrate may be used for packaging, for protecting the electronic circuitry from humidity, dust, cross talk, and the like. In such examples, a metallic frame used in conventional radar devices can be replaced, at least in part, with materials of substantially lower cost.

Antennas

The antenna may comprise a planar array of conducting patches supported by the substrate. However, the invention is not limited to any particular antenna configuration.

RF Front Ends

Examples of the present invention include an improved RF front end for automotive radar, any mm-wave RF front-end (e.g. 60 GHz WLAN/WPAN applications, communication systems, W-band imagers, and the like), and methods and dedicated short range radar communication (DSRC) devices. In some examples, an RF circuit may comprise a monolithic microwave integrated circuit, MMIC. Examples of the present invention include microwave applications (e.g. 1 GHz-300 GHz), in particular millimeter wave (e.g. 30 GHz-300 GHz) antennas, including radar apparatus such as automotive radars. Examples of the present invention include radar front ends, or any other antenna device, including a 3D integrated Butler matrix supported by the antenna substrate.

Example RF front ends include an improved transition that connects an antenna array with an RF circuit. The RF circuit may comprise a silicon-germanium chip, such as a packaged flip-chip mounted transmit receive (T/R) module. An RF circuit may comprise one or more of the following: a low-noise amplifier (LNA), band-pass filter to eliminate spurious electrical noise, a mixer (or frequency down-converter), and one or more matching circuits, such as waveguide matching circuits.

An RF electronic circuit may be proximate or adjacent the antenna substrate. For example, a packaged transmit/receive circuit can be mounted on the opposite side of the substrate from the antenna array, and a transition via through the substrate may be used in an electrical interconnection between the RF circuit and the antenna array. A circuit board, possibly a multilayer circuit board, may be proximate or adjacent to the substrate. A circuit board may be mechanically associated with the substrate, for example through a bonding layer. In some examples, the circuit board may have a similar composition to the substrate.

Electronic circuitry, which may include digital and IF signal processing, a transmit/receive module, a digital signal processor, digital clock, temperature control, microprocessor, and further components, may be associated with one or more circuit boards bonded to or otherwise adjacent the substrate.

Applications

Examples of the present invention relate to radar apparatus, in particular automotive radars. Example applications include improved 77 gigahertz and 77-81 gigahertz automotive radars, and imaging applications such as 94 GHz mm-wave imaging apparatus.

An example apparatus comprises an antenna and an RF front end for a radar device, such as an automotive radar. Example apparatus comprise a substrate in the form of a thin sheet having first and a second sides, an antenna on the first side of the substrate, a radio-frequency circuit (RF circuit). The RF circuit may be flip-chip or flood mounted on the substrate, on the opposite side of the substrate from the antenna.

Apparatus according to examples of the present invention include devices for any radar or wireless application, including cellphones and wireless devices for consumer electronics. Examples of the present invention include a Butler matrix as described herein used in any radar or other electronic device.

An RF circuit, such as a transmit/receive module, and the antenna are in electrical communication through the transition via and the Butler matrix. In the described examples, the output ports of the Butler matrix are connected to the antenna. However, the term "output" here is used for descriptive convenience only, and is not intended to limit examples of the invention to transmitting antennas. Examples of the present invention also include receiver antennas, in particular steerable receiver antennas, and transceiver antennas.

A circuit board proximate the substrate may be used to support an electronic control circuit in communication with the RF circuit. The circuit board may also have a conducting sheet that provides a ground plane for the antenna. Alternatively, the substrate may be metal-clad on one or both sides and etched as necessary, or a ground plane may be introduced as a conducting sheet adjacent the second side of the substrate.

One or more transition vias may be used to interconnect the RF circuit and the antenna. In some examples, a single transition via is used to connect to a column of patches of a patch antenna array, or in other examples a single transition via can be used to connect to the entire antenna.

Hence, an example apparatus includes a radio-frequency front end for an automotive radar comprises a substrate, an antenna, a radio-frequency circuit (RF circuit) supported by the substrate, on the other side of the substrate from the antenna, the antenna and RF circuit being electrically interconnected by a transition via passing through the substrate. A Butler matrix is supported by the same substrate, and is located between the RF circuit and the antenna. The result is a radar apparatus having lower cost, simpler construction, and compactness. The Butler matrix may be formed using planar components that can in whole or in part be formed by etching of metal clad dielectric substrate sheets.

A circuit board adjacent the second side of the substrate can be used to support an electronic control circuit in communication with the RF circuit. The control circuit can be used to steer the radar beam obtained from the antenna. The circuit board and substrate may be proximate, substantially adjacent, adjacent, or bonded together. A control circuit may comprise one or more of the following: a microprocessor/DLL, digital signal processor, digital clock, temperature control, data ports, and the like. In some examples, the circuit board may be a multilayer circuit board.

In some examples, the substrate may form part of a protective housing for the circuit board, the protective housing including non-metallic protective housing elements. This can further reduce cost of manufacture.

Transition Vias

Transition vias ("vias") extend through the substrate to electrically interconnect transmission lines on different sides of the substrate. For example, a substrate may support an antenna on a first side and an RF circuit may be mounted on the second side of the substrate. The first side may be referred to as the upper side and the second side as the lower side, though the terms "upper" and "lower" are not limiting. Transition vias may be used to connect transmission lines from the RF circuit (on the lower side) to input ports of the Butler matrix (on the upper side). A pair of transition vias may also be used in a crossing within the Butler matrix. The lower side of the substrate may have a conducting sheet, acting as a ground plane for the antenna, and also as a ground plane for microstrip lines on the upper side. Microstrip lines may be used within the Butler matrix, and for connections between output ports and the antenna, and for connections between transition vias and the input ports.

Via formation in the substrate may be obtained using mechanical drilling, which allows reduced cost. However, other hole-forming methods may be used, such as laser drilling, etching, stamping, and the like. A minimum number of vias and short traces may be used to reduce substrate area requirements and the overall package size.

A transition via may be an electrical conductor passing through a hole in the substrate. The transition via may have a generally cylindrical shape, for example as a solid cylinder or tube. For example, a transition via may have a diameter between 10 microns and 1 mm, and a length approximately equal to a thickness of the substrate, for example the substrate having a thickness of between 10 microns and 1 mm, for example between 25 and 500 microns, all ranges being inclusive.

In some cases, additional vias may be located proximate a transition via to suppress parasitic parallel plate modes from propagating in the substrate, and/or to achieve a very efficient mode conversion from a microstrip line mode to a CPW mode.

For any transition via, input and output transmission lines (e.g. CPW, microstrip, other planar transmission line, or any other desired transmission line) may both have the same impedance, such as 50 ohms, and a transition via may be configured to be impedance matched to that value, for example within 20%. Impedance matching of the transition via to other transmission line elements, such as coplanar waveguides, reduces return loss. A circular via pad and the gaps around it may be configured for lower field reflections and improved impedance matching. In a representative example, a via pad radius is 9 mils, and the transition via is centered in the via pad and had a radius of 3 mils.

In some examples, a CPW from the RF circuit may be transitioned to a CPW on the other side of the substrate, for example for connection to a Butler matrix input port or an antenna element. For transitions between CPWs on opposite sides of a substrate using a transition via through the substrate, shorting vias may be used between the CPW sections to suppress parasitic parallel plate modes that may occur due to the proximity of the two ground planes on opposed sides of the substrate. Grounding vias may be placed proximate the transition via to suppress parasitic modes and to reduce radiation loss.

In some examples of the present invention, via pads and gaps on the first and/or second sides of the substrate may be optimized so as to match the series inductance of the transition via with a waveguide impedance, and to maintain a generally constant characteristic impedance throughout the transition. For example a 50 ohm characteristic impedance transition may be obtained through suitably shaped and configured via pads and/or gaps.

Other Aspects

A method of transmitting signals to an automotive radar antenna comprises providing an RF circuit, providing an antenna supported by a substrate, the substrate being a polymeric substrate; and transmitting RF signals from the RF circuit to the antenna through an electrical interconnection, the RF circuit and the antenna being located on opposite sides of the substrate, the electrical interconnection comprising a transition via passing through the substrate. The electrical interconnection may comprise a connector waveguide, the transition via, and an antenna feed, the connector waveguide transmitting signals from the RF circuit to the transition via, the antenna feed transmitting signals from the transition via to at least part of the antenna. The transition via may be configured to be impedance matched to the antenna feed so as to reduce a transmission loss within the electrical interconnection.

The invention is not restricted to the illustrative examples described above. Examples are not intended as limitations on the scope of the invention. Changes therein, other combinations of elements, and other uses will occur to those skilled in the art. The scope of the invention is defined by the scope of the claims.

Having described our invention, we claim:

1. An apparatus, the apparatus being a radar apparatus comprising:
   a substrate, having a first side and a second side;
   an antenna disposed on the first side of the substrate, the antenna comprising antenna elements;
   a Butler matrix supported by the substrate, the Butler matrix having input ports and output ports,
   each output port of the Butler matrix being electrically connected with a group of antenna elements; and
   input connections configured to allow electrical communication with the input ports of the Butler matrix.

2. The apparatus of claim 1, further comprising an RF circuit, the RF circuit being supported proximate or adjacent the second side of the substrate.

3. The apparatus of claim 2, each input connections between the RF circuit and an input port of the Butler matrix comprising:
   a transition via through the substrate;
   a first input transmission line between the RF circuit and the transmission via; and
   a second input transmission line between the transition via and the input port.

4. The apparatus of claim 1, the Butler matrix including a plurality of microstrip lines disposed on the first side of the substrate.

5. The apparatus of claim 1, the Butler matrix having four input ports and four output ports,
   each output port being connected to a column of radiative elements within the antenna.

6. The apparatus of claim 1, the Butler matrix including a crossover region, the crossover region including
   a first transmission line on the first side of the substrate,
   a second transmission line on the second side of the substrate, and
   a transition via at each end of the second transmission line, connecting to the first side of the substrate.

7. The apparatus of claim 6, wherein the second transmission line comprises a coplanar waveguide (CPW).

8. The apparatus of claim 6, wherein the first transmission line comprises a microstrip line.

9. The apparatus of claim 6, wherein the first transmission line comprises a coplanar waveguide (CPW) proximate the crossover.

10. An apparatus, the apparatus being a radar apparatus comprising:
    a substrate, having a first side and a second side;
    an antenna disposed on the first side of the substrate, the antenna comprising radiative elements;
    a Butler matrix supported by the substrate, the Butler matrix having input ports and output ports,
    each output port of the Butler matrix being electrical connected with a group of radiative elements;
    a radio-frequency circuit (RF circuit) supported on the second side of the substrate; and input connections between the RF circuit and the input ports of the Butler matrix.

11. The apparatus of claim 10, each input connection between the RF circuit and an input port of the Butler matrix comprising a transition via through the substrate, the input ports and the output ports of the Butler matrix being located on the first side of the substrate.

12. The apparatus of claim 10, the substrate comprising a liquid crystal polymer.

13. The apparatus of claim 10, the apparatus being a radio-frequency (RF) front end assembly for a radar, the antenna being a patch antenna comprising an array of conducting patches supported by the first side of the substrate, the radar providing a steerable radar beam using the Butler matrix.

14. The apparatus of claim 10, the Butler matrix including at least one crossover, the crossover including a transmission line on the first side of the substrate crossing over a second transmission line on the second side of the substrate.

15. The apparatus of claim 14, the crossover being provided by the transmission line on the first side of the substrate crossing over a CPW on the second side of the substrate.

16. The apparatus of claim 15, the crossover being provided by a CPW on the first side of the substrate crossing over a CPW on the second side of the substrate.

17. The apparatus of claim 15, the CPW on the first side of the substrate being transitioned from a microstrip line using a pair of ground regions on the first side of the substrate.

18. The apparatus of claim 10, the second side of the substrate supporting a conducting sheet, the conducting sheet providing a ground plane for a plurality of microstrip lines within the Butler matrix and for the antenna.

19. The apparatus of claim 10, further comprising a circuit board proximate the second side of the substrate, the circuit board supporting a control electronic circuit in electrical communication with the RF circuit.

20. The apparatus of claim 10, the Butler matrix comprising a plurality of planar waveguide components supported by the substrate.

* * * * *